United States Patent [19]
Tomassetti

[11] Patent Number: 5,396,028
[45] Date of Patent: Mar. 7, 1995

[54] METHOD AND APPARATUS FOR TRANSMISSION LINE TERMINATION

[75] Inventor: Stephen R. Tomassetti, Elmhurst, Ill.

[73] Assignee: Texas Instruments Incorporated, Dallas, Tex.

[21] Appl. No.: 58,114

[22] Filed: May 5, 1993

[51] Int. Cl.⁶ .................. H04L 25/02; H04M 9/00
[52] U.S. Cl. ........................ 178/69 R; 379/394
[58] Field of Search ............ 379/394, 398, 7, 36; 178/69 R

[56] References Cited

U.S. PATENT DOCUMENTS

| | | | |
|---|---|---|---|
| 4,661,978 | 4/1987 | Hirata | 379/394 |
| 4,713,827 | 12/1987 | Lauffer et al. | 375/7 |
| 5,271,059 | 12/1993 | Dielacher et al. | 379/398 |

Primary Examiner—Stephen Chin
Assistant Examiner—Kevin Kim
Attorney, Agent, or Firm—Robby T. Holland; Wade James Brady, II; Richard L. Donaldson

[57] ABSTRACT

A method and apparatus for transmission line termination is provided in which a transmission line (12 and 14) is terminated by transmission gates (20 and 22) at a transmitter (24) and a receiver (26). The resistances of the transmission gates (20 and 22) are controlled by precision resistance control circuits (30 and 31), respectively. Precision resistance control circuit (30) uses a reference resistor (32) to control the resistance of the transmission gate (20).

4 Claims, 1 Drawing Sheet

METHOD AND APPARATUS FOR TRANSMISSION LINE TERMINATION

TECHNICAL FIELD OF THE INVENTION

This invention relates generally to electronic circuits, and more particularly to a method and apparatus for transmission line termination.

BACKGROUND OF THE INVENTION

In high speed communications systems, data is transmitted across transmission lines. These transmission lines run between transmitters and receivers, which are typically semiconductor chip devices. To minimize distortion of the transmitted signal, transmission lines require proper transmission line termination.

Transmission line termination is generally achieved through a fixed, off-chip resistance that precisely matches the transmission line characteristic impedance. Such transmission line termination is off-chip because of difficulties in creating precision on-chip resistances. Typically, tolerances of less than five percent are required for transmission line termination. These kind of tolerances are difficult to achieve with high volume semiconductor processing methods, for example, because of variations in sheet resistance and line width control.

Furthermore, many communications applications use high density digital CMOS technology for high speed. As speed performance improves, process elements such as poly and moat resistors are often unavailable to circuit designers because of the use of silicide to minimize sheet resistances. Thus, to create resistors, additional mask levels, or the use of analog specific processes, are required.

The use of off-chip precision resistors for transmission line termination presents significant drawbacks. For example, off-chip resistors require significant circuit board space, and increase circuit board layout complexity and cost. Furthermore, the distances between off-chip resistors and signal generators or receivers are fairly large, although these distances should be as small as possible to reduce stub length reflection problems.

SUMMARY OF THE INVENTION

Therefore, a need has arisen for an on-chip transmission line termination scheme which overcomes the aforementioned problems.

In accordance with the present invention, a method and apparatus for transmission line termination is provided which substantially eliminates or reduces disadvantages or problems associated with prior art transmission line termination schemes.

In particular, a transmission line termination system is provided in which a transmission gate having a resistance is coupled to a transmission line for terminating the transmission line. A precision resistance control circuit is coupled to the transmission gate and operable to control the resistance of the transmission gate for transmission line termination. A reference resistor is coupled to the precision resistance control circuit, such that the precision resistance control circuit controls the resistance of the transmission gate based on the reference resistor.

In a particular embodiment, the precision resistance control circuit includes a reference cell and resistance control feedback circuitry. The resistance control feedback circuitry generates control signals for controlling the resistance of the transmission gate.

A method of terminating a transmission line is also disclosed, wherein current flows through a reference resistor. Current also flows through a reference cell, and these currents are compared. Control voltages are generated in response to the comparing of the currents, and these control voltages are used to control the resistance of a transmission gate used to terminate a transmission line.

An important technical advantage of the present invention is the fact that it allows for termination of transmission lines on an integrated circuit through use of a transmission gate, for transmission line termination, and a precision resistance control circuit for controlling the resistance of the transmission gate.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1A:
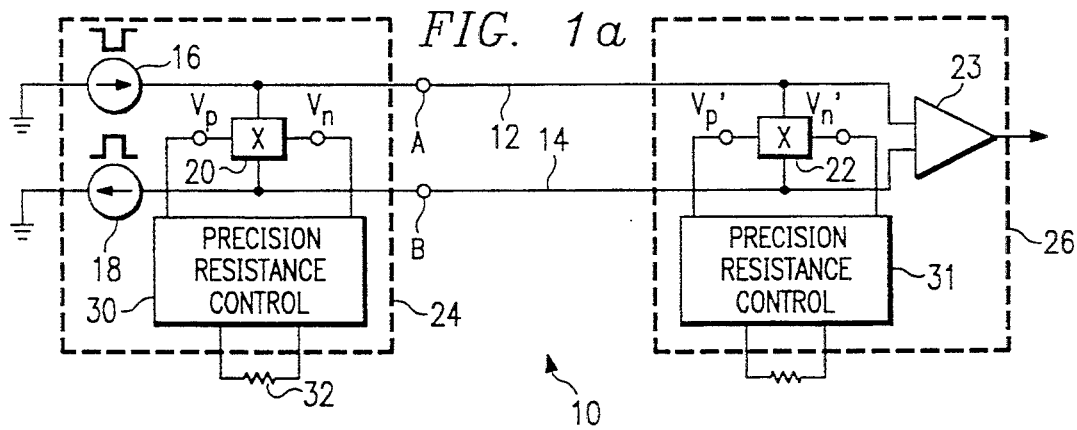
FIG. 1a illustrates a circuit schematic of a communications system including on-chip precision resistance control constructed according to the teachings of the present invention.

FIG. 1a illustrates a particular embodiment of a communications system 10 including precision resistance control according to the teachings of the present invention. As shown in FIG. 1a, transmission lines 12 and 14 are driven by current sources 16 and 18. This particular transmission scheme allows for differential communications in the current mode. It should be understood that the present invention can be used in conjunction with other communications systems without departing from the intended scope herein. For example, as will be discussed, single-ended transmission lines in the voltage mode can also be used.

The most efficient transfer across transmission lines occurs when the termination resistance matches the characteristic impedance of the transmission line. As shown in FIG. 1a, transmission gates 20 and 22 are used to terminate the transmission lines at a transmitter 24 and at a receiver 26, respectively. As will be discussed, these transmission gates 20 and 22 will be controlled to match the characteristic impedance of the transmission lines.

Blocks 24 and 26 represent single chips, in this example, a transmitter and a receiver, respectively. Blocks 24 and 26 include on-chip transmission gates 20 and 22 for terminating the transmission lines 12 and 14 at the transmitter and receiver, respectively. The nodes A and B represent the output terminals of block 24 to which transmission lines 12 and 14 are coupled.

Transmission gate 20 provides the termination resistance for transmission lines 12 and 14 at the transmitter. The resistance of transmission gate 20 is controlled by a precision resistance control circuit 30. Precision resistance control circuit 30 generates control signals $V_p$ and $V_n$ to control the resistance of transmission gate 20. Precision resistance control circuit 30 is also coupled to a reference resistor 32, to be discussed. A precision resistance control circuit 31 is also included in block 26 for generating control signals $V_p'$ and $V_n'$. These control signals control the resistance of transmission gate 22. For clarity, only transmission gate 20 will be discussed, it being understood that the description applies to transmission gates coupled at receivers as well.

Figure 1B:
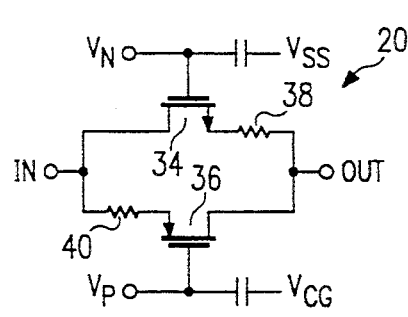
FIG. 1b illustrates a particular embodiment of a transmission gate according to the teachings of the present invention.

FIG. 1b illustrates a particular embodiment of a transmission gate, such as transmission gate 20, according to the teachings of the present invention. As shown in FIG. 1b, transmission gate 20 includes transistors 34 and 36. Control signal $V_n$ is coupled to the gate of transistor 34. The source of transistor 34 is coupled through resistor 38 to the output terminal of the transmission gate 20. The source of transistor 36 is coupled to the input of the transmission gate 20 through resistor 40. The gate of transistor 36 is coupled to the control signal $V_p$. The drain of transistor 36 is coupled to the output terminal of transmission gate 20. The drain of transistor 34 is coupled to the input terminal of the transmission gate 20.

Through control signals $V_n$ and $V_p$, the effective resistances of transistors 34 and 36 are controlled. Thus, the effective resistance of transmission gate 20 can be adjusted so as to properly terminate transmission lines 12 and 14 shown in FIG. 1a.

Figure 2:
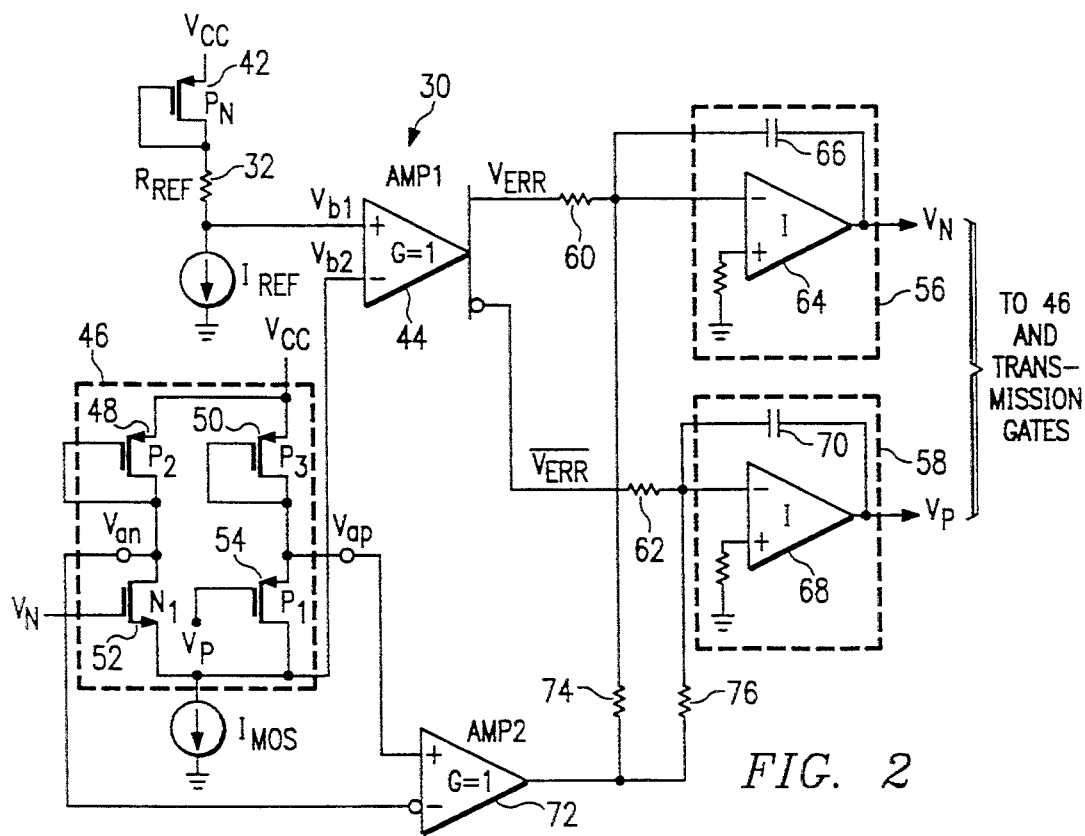
FIG. 2 illustrates a particular embodiment of a circuit for precision resistance control according to the teachings of the present invention.

FIG. 2 illustrates a particular embodiment of precision resistance control circuit 30 according to the teachings of the present invention. A reference current $I_{REF}$ is pulled through reference resistor 32. Reference resistor 32 is coupled to Vcc through transistor 42. Transistor 42 is coupled as a load resistor. Reference resistor 32 can be off-chip, while the rest of the circuitry of FIG. 2 is on a single chip. In an alternate embodiment, resistor 32 may be on-chip, provided that it is trimmed to a precise value.

Amplifier 44 compares the voltage appearing at $V_{b1}$ with that appearing at $V_{b2}$. $V_{b2}$ is generated by reference cell 46. Reference cell 46, which includes transistors 48 and 50. Transistors 48 and 50 are coupled as resistors, and are matched with transistor 42. Reference cell 46 also includes transistors 52 and 54. Transistors 52 and 54 are coupled between transistors 48 and 50 respectively and a reference current $I_{MOS}$. The source of transistor 52 is coupled to the drain of transistor 54. The drain of transistor 52 is coupled to transistor 48, and the source of transistor 54 is coupled to transistor 50. The current source, $I_{MOS}$, pulls current through transistors 48, 50, 52, and 54. The current source is coupled to the source of transistor 52 and the drain of transistor 54. $I_{MOS}$ is equal to $I_{REF}$.

Amplifier 44, by comparing the voltages at $V_{b1}$ and $V_{b2}$, generates error voltage signals $V_{err}$ and $\overline{V}_{err}$. These error voltages are coupled to integrators 56 and 58, respectively, through resistors 60 and 62. Resistors 60 and 62 may be transistors coupled as resistors. Integrator 56 includes amplifier 64 and capacitor 66 coupled as shown in FIG. 2. Likewise, integrator 58 includes amplifier 68 and capacitor 70. The error voltage signals are coupled through the respective resistors to the negative inputs of the amplifiers 64 and 68. The output of the amplifiers 64 and 68 are fed back to the negative input through the respective capacitors 66 and 70. The outputs of integrators 56 and 58 are the control voltage signals $V_n$ and $V_p$, respectively. These control voltage signals are coupled to reference cell 46 and other on-chip transmission gates such as transmission gate 20.

A second comparing amplifier, amplifier 72, compares the voltages generated at $V_{an}$ and $V_{ap}$, the voltages appearing, respectively, at the drain of transistor 52 and at the source of transistor 54. The voltage $V_{an}$ is applied to the inverting input of amplifier 72. The output of amplifier 72, which is another error signal, is coupled through resistors 74 and 76 to the input of integrator 56 and 58, respectively. Resistors 74 and 76 may be transistors coupled as resistors as described above.

In operation, precision resistance control circuit 30 generates control signals to control and linearize the resistance of various transmission gates, such as transmission gate 20, on a particular communications chip. With these control signals, precisely controlled resistances can be produced on-chip. These resistances are based on the single external precision reference resistor 32. Amplifier 44 compares the voltage at (or current through) the external reference resistor 32 with the voltage at $V_{b2}$ (or current through reference cell 46). In effect, this amplifier is comparing the resistance of the reference resistor 32 with that of transistors 52 and 54 of reference cell 46. Amplifier 72 compares the voltages appearing at $V_{an}$ and $V_{ap}$, in effect comparing any differences in current flowing through transistors 52 and 54. The outputs of comparing amplifiers 44 and 72 are integrated through integrators 56 and 58 to generate $V_n$ and $V_p$. The control signals $V_n$ and $V_p$ are fed back to the reference cell 46 through the gates of transistors 52 and 54, resulting in the resistance of the reference cell 46 equalling that of reference resistor 32. $V_n$ and $V_p$ are also coupled to various on-chip transmission gates, such as transmission gate 20.

The reference resistor 32 is selected to match the transmission line characteristic impedance, and thus any termination resistances on-chip, such as transmission gate 20, would also match the transmission line characteristic impedance. Furthermore, by altering the channel widths of the transistors used at various transmission gates, termination resistances different from that of the reference resistor can be generated at various places on the chip, thus allowing for termination of transmission lines with differing characteristic impedances.

The above described technology is particularly suited for CMOS technology. The common mode range and maximum applied voltage to the remote (on-chip) terminations are defined by the control voltages applied to the reference transmission gate transistors 52 and 54. Performance of the remote terminations are limited by the AC performance of the reference transmission gate 46. Generally, the resistances will be controlled linearly for most of the band width capability of CMOS technology.

Conventional notations have been used throughout the figures. Thus, for example, transistor 52 is an N-channel MOSFET, and transistor 54 is a P-channel MOSFET. It should be understood that other technologies than CMOS may be used without departing from the intended scope herein.

Figure 3:
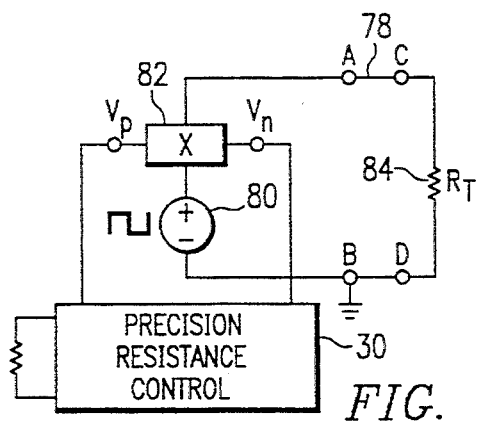
FIG. 3 illustrates another embodiment of a communications system including on-chip precision resistance control constructed according to the teachings of the present invention.

FIG. 3 illustrates a single-ended transmission line scheme supplied through the voltage mode. As shown, transmission line 78 is driven by voltage source 80.

Termination of the transmission line is performed through transmission gate 82. The receiving end of the transmission line is terminated by termination resistor 84. The resistance of transmission gate 82, as described above, is controlled by the control signals $V_p$ and $V_n$ generated by precision resistance control circuit 30. It should be understood that the present invention can be integrated in a myriad of transmission line schemes without departing from the intended scope herein.

Although the present invention has been described in detail, it should be understood that various changes, substitutions and alterations can be made without departing from the spirit and scope of the invention as defined by the appended claims.

What is claimed is:

1. An integrated complementary metal oxide semiconductor (CMOS) circuit for transmission line termination, comprising:
    a reference cell having an N-channel CMOS transistor and a P-channel CMOS transistor with a source/drain connection;
    a direct current feed back loop having:
    a first amplifier connected to the source/drain connection of the N-channel CMOS transistor and the P-channel CMOS transistor of the reference cell for comparing current through a reference resistors resistance that is coupled to a transmission line with resistance of the N-channel CMOS transistor and the P-channel CMOS transistor of said reference cell;
    a second amplifier connected to the N-channel CMOS transistor and the P-channel CMOS transistor of the reference cell for comparing differences in current flow through the N-channel CMOS transistor and the P-channel CMOS transistor;
    a first integrator connected to the first amplifier and the second amplifier having its output connected to the gate of the N-channel CMOS transistor; and
    a second integrator connected to the first amplifier and the second amplifier having its output connected to the gate of the P-channel CMOS transistor.

2. The integrated CMOS transmission line circuit of claim 1 further comprising:
    a transmission gate having a P-channel CMOS transistor and an N-channel CMOS transistor having a first source/drain connection and a second source/drain connection, the gate of the N-channel CMOS transistor connected to the output of the first integrator and the gate of the P-channel CMOS transistor connected to the output of the second integrator.

3. A method of terminating a transmission line, comprising the steps of:
    flowing current through a reference resistor;
    flowing current through a reference cell having a P-channel CMOS transistor and an N-channel CMOS transistor having a source/drain connection;
    comparing current flowing through the reference cell and the reference resistor;
    generating control voltages in response to said step of comparing; and
    controlling resistance of a transmission gate having a P-channel CMOS transistor and an N-channel CMOS transistor with their sources and drains coupled together by connecting a control voltage to the gate of the P-channel CMOS transistor and another control voltage to the gate of the N-channel CMOS transistor.

4. The method of claim 3, and further comprising the step of generating error voltages in response to said step of comparing, and wherein said step of generating control voltages includes integrating the error voltages to generate the control signals.

* * * * *